(12) United States Patent
He et al.

(10) Patent No.: US 8,009,332 B2
(45) Date of Patent: Aug. 30, 2011

(54) APPARATUS AND METHODS FOR TWO POINT TONE REPRODUCTION CURVE CALIBRATION

(75) Inventors: Zhen He, Sherwood, OR (US); Kuangti Ted Cheng, Beaverton, OR (US)

(73) Assignee: Xerox Corporation, Norwalk, CT (US)

( * ) Notice: Subject to any disclaimer, the term of this patent is extended or adjusted under 35 U.S.C. 154(b) by 929 days.

(21) Appl. No.: 11/954,385

(22) Filed: Dec. 12, 2007

(65) Prior Publication Data

US 2009/0153911 A1    Jun. 18, 2009

(51) Int. Cl.
*H04N 1/10* (2006.01)

(52) U.S. Cl. .......... 358/406; 358/1.9; 358/3.1; 358/537; 399/49; 399/30; 382/274; 382/275

(58) Field of Classification Search ............... 358/406, 358/1.9, 3.06, 3.26, 518, 514, 494, 3.1; 399/30, 399/49, 50, 27
See application file for complete search history.

(56) References Cited

U.S. PATENT DOCUMENTS

| | | | | |
|---|---|---|---|---|
| 5,528,339 A * | 6/1996 | Buhr et al. | ...... | 355/32 |
| 6,055,011 A * | 4/2000 | Nishimura | ...... | 347/254 |
| 6,594,388 B1 * | 7/2003 | Gindele et al. | ...... | 382/167 |
| 7,372,597 B2 * | 5/2008 | Topfer et al. | ...... | 358/1.9 |
| 7,680,425 B2 * | 3/2010 | Hama et al. | ...... | 399/49 |
| 7,715,050 B2 * | 5/2010 | Topfer et al. | ...... | 358/1.9 |
| 7,751,734 B2 * | 7/2010 | Mestha et al. | ...... | 399/49 |
| 2003/0053092 A1 * | 3/2003 | Ohkubo | ...... | 358/1.9 |
| 2006/0077405 A1 * | 4/2006 | Topfer et al. | ...... | 358/1.9 |
| 2006/0153580 A1 * | 7/2006 | Mo et al. | ...... | 399/49 |
| 2006/0153582 A1 * | 7/2006 | Mo et al. | ...... | 399/49 |
| 2007/0092273 A1 * | 4/2007 | Shiroki et al. | ...... | 399/27 |
| 2008/0151319 A1 * | 6/2008 | Rogalski et al. | ...... | 358/406 |
| 2008/0186520 A1 * | 8/2008 | Topfer et al. | ...... | 358/1.9 |
| 2008/0204773 A1 * | 8/2008 | Morgana et al. | ...... | 358/1.9 |
| 2009/0033954 A1 * | 2/2009 | Bray | ...... | 358/1.9 |

* cited by examiner

*Primary Examiner* — Negussie Worku
(74) *Attorney, Agent, or Firm* — Oliff & Berridge, PLC

(57) ABSTRACT

Systems and methods provide increased accuracy in recalibrating the tone reproduction curve (TRC) for a photoelectric image sensor that senses density values. The sensor outputs sensed density values for tone patches. A recalibrated TRC is calculated from the original TRC, the known densities of the tone patches, and the sensed density values of the tone patches.

19 Claims, 4 Drawing Sheets

APPARATUS AND METHODS FOR TWO POINT TONE REPRODUCTION CURVE CALIBRATION

BACKGROUND

One object of image acquisition devices, such as Xerographic copying, scanning, and printing systems, is to output images having colors and densities that have a direct correlation to the colors and densities of the input images. A common technique for monitoring the quality of output images is to utilize one or more test patches of predetermined densities. The actual density of the printing material, toner or ink for example, in a test patch is optically measured to determine the effectiveness of the image acquisition device to produce correct densities in output images.

Densities of input images are sensed by sensors such as densitometers. A densitometer is a device for determining the density of print material on a surface, such as a visible-light densitometer, an infrared densitometer, an electrostatic voltmeter, or any other device which makes a measurement from which the density of print material may be determined. A reflection densitometer detects the optical density of an image portion by sensing the amount of light reflected from the image portion in relation to the amount of light impinging on the image portion. In Xerographic image acquisition devices such as scanners, the sensor that detects the image is often a charge coupled device (CCD).

The optical density of an image portion is equal to the absorbance of the image portion, which is defined as $\log_{10}(I_0/I)$ where $I_0$ is the intensity of light incident on the image portion, and $I$ is the intensity of the light transmitted through the image portion. Although absorbance technically has no units, absorbance or optical density is sometimes expressed in "absorbance units" or AUs.

Sensors such as CCDs in scanners are generally calibrated at the time of manufacture by the use of a set of tone patches of varying and known densities. Because the sensors used in scanners often do not exhibit a linear relationship between input density values and output sensed density values, a set of tone patches that includes more than two tone patches often is used so that non-linear higher-order correction can be implemented. For example, a set of tone patches for calibrating a scanner often includes five tone patches. A common density configuration for sets of five tone patches is 0.1, 0.3, 0.6, 1.2, and 1.5.

In operation, the tone patches are sensed by the scanner's sensor and sensed density values are output by the scanner's sensor. These sensed density values and the known, correct density values for the tone patches are used to create a tone reproduction curve (TRC) for the scanner's sensor. A TRC represents the correspondence between density values sensed and Output by a scanner's sensor and the correct density values. That is, the TRC linearizes the sensor's output. Because only a finite number of tone patches are sensed in the initial calibration, a TRC is generated by interpolation and extrapolation such as by polynomial matching. Commonly, the resulting TRC is sampled and stored as a look-up table (LUT) in the memory of the scanner. The original TRC is usually curved as shown by TRC 100 in FIG. 1.

With time and use, such as in a customer environment, the correction afforded by the TRC becomes less accurate. This occurs from various causes, including changes in the intensity and frequency distribution of the luminous output of the scanner's lamp and changes in the output characteristics of the scanner's sensor. In response, methods have been implemented to recalibrate the output of scanners.

One method that has been used is to recalibrate the scanner, such as at the factory or in the field, by use of a tone patch set having the same, or a similar, number of tone patches as the tone patch set that was initially used to calibrate the scanner. This method has the disadvantages that it is necessary to ship the scanner to a service facility for service or to have a technician come to the scanner, necessitating that the scanner remains uncalibrated and, possibly, unavailable for use for an extended period of time. Further, either external equipment is required to calculate the new TRC, or additional processing power and memory are needed in the scanner to carry out the processing. Hardware able to carry out the necessary processing and able to store the necessary values to calculate a TRC is often more expensive than the hardware necessary for normal operation of a scanner. For at least these reasons, this method typically is not used because it is expensive, time consuming, and can incur significant down time for the scanner.

Another method is to service the scanner by replacing those parts, such as the lamp or image sensor, that have developed deviations over time. However, this method is expensive and can incorporate significant delays before recalibration. Further, unless the replacement parts accurately match the original performance characteristics of the original parts used to calculate the original TRC, this method does not generally produce significant improvement.

In another method, the scanner is recalibrated in the field by use of a calibration strip in the scanner. The calibration strip generally contains two patches of different densities, usually at the extremes of the density range, such as 0.1 and 1.5. These patches of the calibration strip are sensed by the scanner's sensor, which outputs sensed densities for the tone patches. The scanner then recalibrates itself based on the sensed densities and the known densities of the tone patches. Because only two tone patches are commonly used, however, in this situation the scanner is only able to generate a new TRC that is linear. That is, the TRC has the form of $y_i = g * x_i + b$ and is a straight line as shown by TRC 200 in FIG. 1. Because TRC curves exhibit non-negligible high-order curvature, as shown in TRC 100 FIG. 1, a linear TRC approximation, such as TRC 200, is not accurate enough for many applications.

Additionally, further to the last method of recalibrating a scanner, the calibration strip included in the scanner can yellow or otherwise deviate from the known densities over time. Thus, recalibration techniques that use the calibration strip will incorporate the deviations from the expected values exhibited by the calibration strip from the known density values.

SUMMARY

In order to address the deficiencies of the known methods of recalibrating scanner sensor output, systems and methods by which a second TRC is generated, based on the original manufacturer-generated TRC and sensed values of tone patches of known densities, are disclosed. The systems and methods provide superior results that allow for reduced memory requirements, reduced costs of implementation, and result in superior recalibrated performance over known systems and methods.

A method of calibrating an image sensing system includes: sensing, by a photoelectric sensor, a first set of tone patches having first known densities and outputting first sensed density values; generating a first tone reproduction curve based on the first sensed density values and the first known densities, the first tone reproduction curve providing corrected density values for corresponding sensed density values output by the photoelectric sensor; storing the first tone reproduction curve in a storage device; sensing, by the photoelectric sensor, a second set of tone patches having second known densities and outputting second sensed density values, the second set of tone patches being sensed at a time subsequent to a time when the first set of tone patches was sensed; and generating a second tone reproduction curve based on the first tone reproduction curve, the second sensed density values, and the second known densities.

An image acquisition device includes: a photoelectric sensor configured to sense a density of a portion of an image and to output sensed density values; a storage unit storing a tone reproduction curve that provides a corrected density output corresponding to an input sensed density value; and a processor configured to produce a calibration correction for the tone reproduction curve from sensed density values $z_i$, i=1 to 2, of two tone patches having known densities, the processor configured to: determine difference values $\Delta y_i = y_i - f(z_i)$, i=1 to 2, where $y_i$ is the known density of the ith tone patch of the two tone patches and $f(z_i)$ is the corrected density value output by the tone reproduction curve corresponding to the ith sensed density value $z_i$, and generate the calibration correction for the tone reproduction curve to be $y_j = f(v_j) + ((\Delta y_1 - \Delta y_2)/(z_1 - z_2))*(v_j - z_2) + \Delta y_2$ where $y_j$ is the jth corrected density, $f(v_j)$ is the tone reproduction curve value corresponding to a jth input sensed density from an image, and $v_j$ is the jth sensed density value.

An image acquisition device calibration system includes: a photoelectric sensor configured to sense a density of a portion of an image and to output sensed density values; a storage unit storing a first tone reproduction curve that provides a corrected density output corresponding to a sensed density value sensed by the photoelectric sensor; and a processor configured to: sense, using the photoelectric sensor, sensed density values $z_i$, i=1 to m, of a set of (m) calibration tone patches having known densities $w_i$, i=1 to m, and generate a second tone reproduction curve based on the first tone reproduction curve, the second sensed density values $z_i$, i=1 to m, and the second known densities $w_i$, i=1 to m.

EMBODIMENTS

Figure 1:
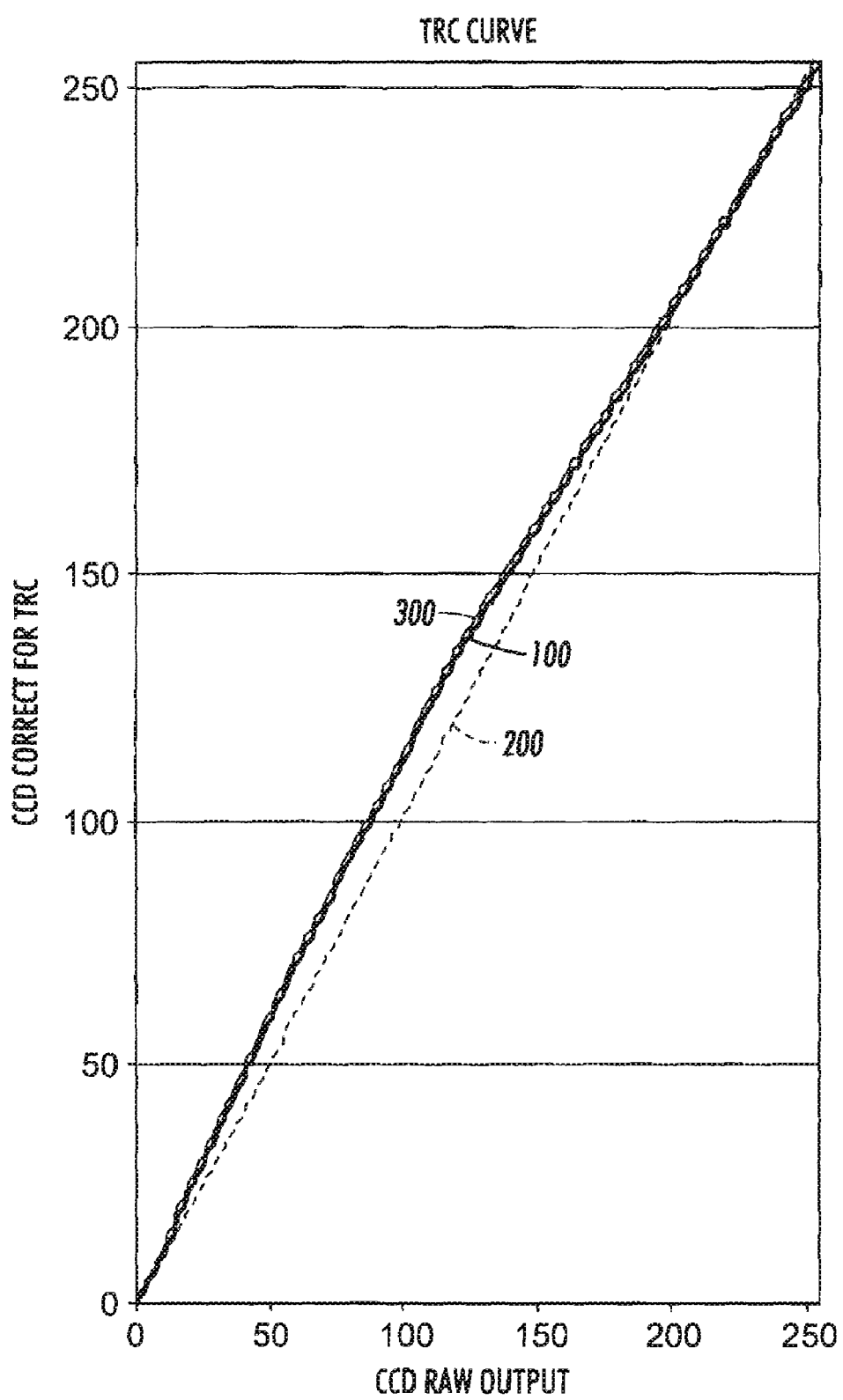
FIG. 1 shows a typical TRC for an image acquisition device sensor, and corrected TRCs produced by a known method and by the presently disclosed methods.

FIG. 1 shows a graph of TRCs for an image acquisition device sensor, such as a CCD sensor. The coordinates of both axes of the graph are in units of gray level from 0 to 255. As shown, the TRCs convert raw output of the image acquisition device scanner to corrected output. In particular, 100 is an original TRC determined in the factory, e.g., for a new scanner, 200 is a corrected TRC calculated according to a known technique and that is a straight line, and 300 is a corrected TRC determined according to the new techniques described herein. The inventors have discovered that the shape of TRCs do not appreciably change over the lifetime of a sensor, even though through aging, the sensor's output may deviate or drift over time such that the sensed density values for given input densities may change over time. By use of information contained in the original TRC 100, the disclosed systems and methods can produce recalibrated TRCs 300 having the accuracy of greater-than-two-point calibration even when using a recalibration tone patch set of only two tone patches. Thus, significant cost savings can be realized because fewer tone patches are required to achieve the same accuracy that would be achieved using more tone patches under conventional methods, less memory is required to store the resulting recalibration data, the recalibration can be done in the field and even by the customer, and the recalibration can be done automatically. In MFP scanner applications, while calibration patches usually are originally specified by density values, these values can be converted to colorimetry values as the target values, linear RGB for example, prior to carrying out the channel-wise gray balance calibration.

Figure 2:
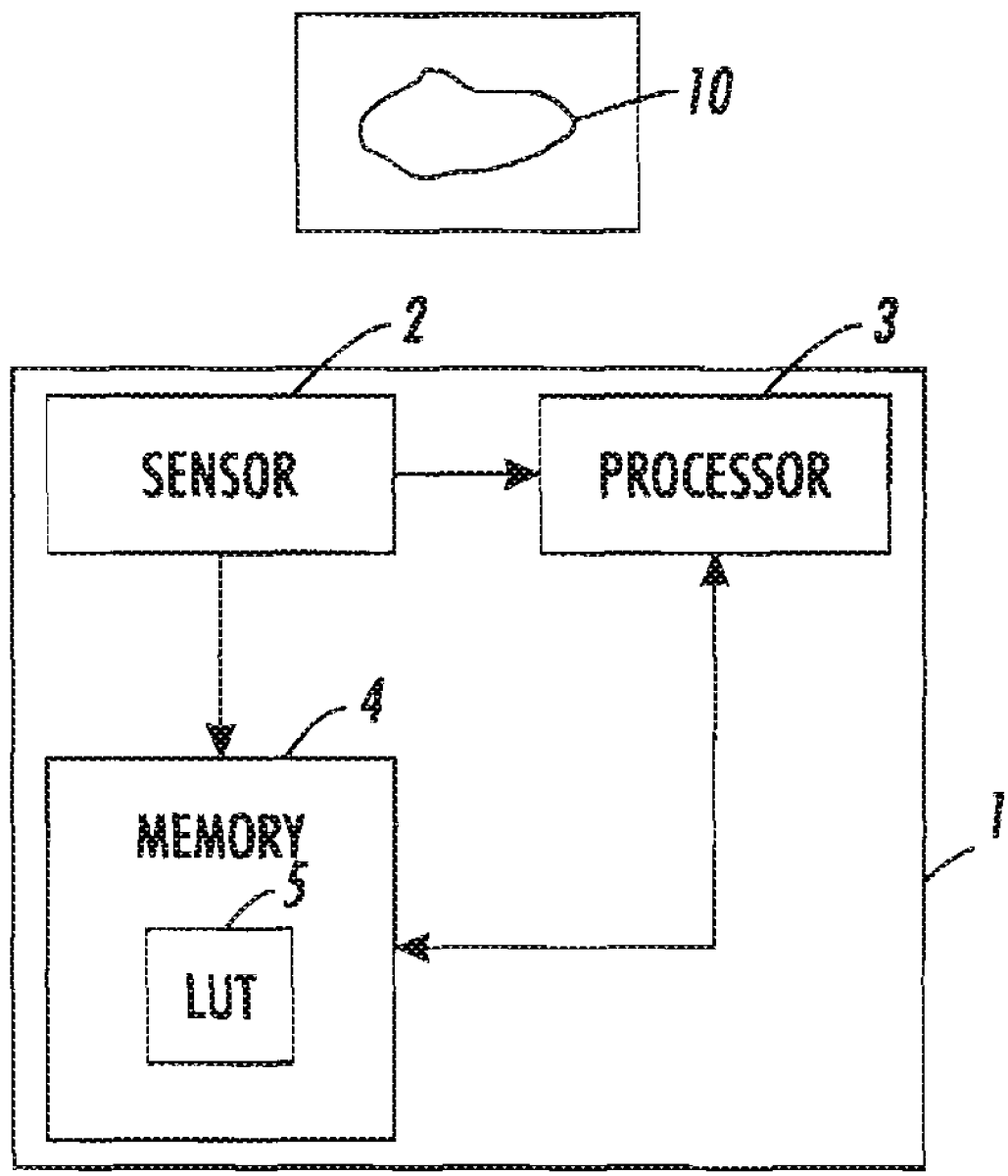
FIG. 2 shows a block diagram of a scanner 1.

FIG. 2 shows a block diagram of a scanner 1. In embodiments, scanner 1 includes a sensor 2, a processor 3, and a memory 4 that contains a LUT 5. Sensor 2 is a photoelectric sensor that senses images by sensing the density of portions of a source image 10. Sensor 2 can be a color sensor sensing, for example, the densities of colors at red, blue, and green portions of the color spectrum. Sensor 2 also can have different numbers of color sensors covering different portions of the color spectrum. Sensor 2 is connected to memory 4 and processor 3.

Figure 3A:
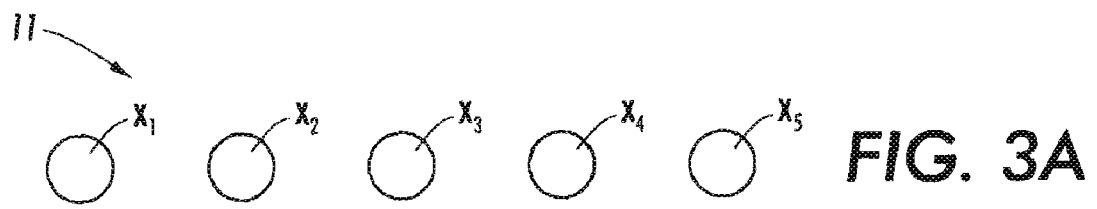
FIGS. 3A-3C show an initial set of calibration tone patches 11, a second set of calibration tone patches 12, and a calibration strip 13, respectively.

Scanner 1 can be calibrated at the time of manufacture or shipment by use of a set of tone patches of varying and known densities $x_i$, i=1 to n, as shown in FIG. 3A. Because TRCs for sensors 2 such as CCD sensors are non-negligibly non-linear, a set of tone patches that includes more than two tone patches is used so that an accurate non-linear TRC 100 (see FIG. 1) can be generated. In embodiments, an initial tone patch set 11 of five tone patches is used. In preferred embodiments, tone patch set 11 has tone patches of values $x_1=0.1$, $x_2=0.3$, $x_3=0.6$, $x_4=1.2$, and $x_5=1.5$, as shown in FIG. 3A. However, more or less numbers of tone patches and different tone densities can be used.

In operation, the tone patches 11 are sensed by sensor 2 which outputs sensed density values $y_i$, i=1 to n. These sensed density values $y_i$ and the known correct density values $x_i$ for the tone patches 11 are used to create a TRC for the sensor 2 of the scanner 1. Because only a finite number of tone patches are sensed in the initial calibration, the TRC is generated by interpolation and extrapolation. In embodiments, the TRC is modeled by using an nth-order polynomial where n is one less than the number of tone patches in the tone patch set 11. In preferred embodiments, the TRC is calculated by use of $5^{th}$ degree polynomials, however any suitable method can be used to calculate the TRC. The TRC is used to convert density values sensed by sensor 2 to the correct values by compensating for the inaccuracies of the sensor 2. In embodiments, the resulting TRC is sampled and stored in a look-up table (LUT), each TRC value corresponding to the correct density value.

Figure 4:
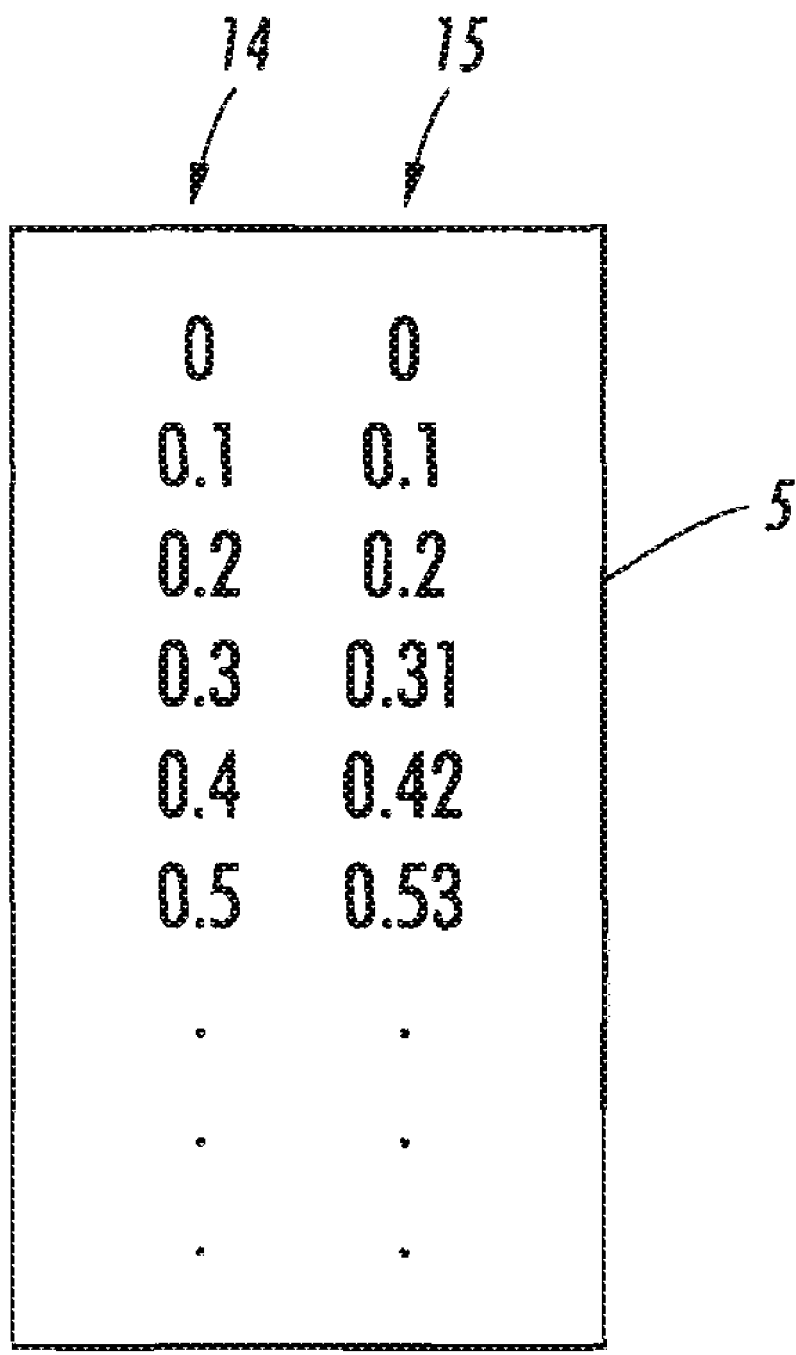
FIG. 4 shows a typical LUT.

FIG. 4 shows a typical LUT 5. In LUT 5, the first column contains values 14 representing possible sensed values output by a sensor. The second column contains the correct density values 15 corresponding to the values 14 in the first column. In operation, once a sensed density value is obtained from a sensor, the value 15 matching the sensed density value in the first column of LUT 5 is located. The corresponding correct density value 15 is then read. If the sensed density value output by the sensor is not represented in the first column of LUT 5, any of several methods can be used. In one method, the two values 14 in between which the sensed density value falls can be located and the relative location of the sensed density value between the two values 14 can be calculated as a ratio. The correct density value to be output is then calculated as the value at the calculated ratio between the correct density values 15 corresponding to the two values 14 previously identified. In another method, the closest value 14 can be used. In a third method, the value 14 that is equal to or that is the first value 14 larger than the sensed density value can be used. In a fourth method, the value 14 that is equal to or that is the first value 14 smaller than the sensed density value can be used. However, any other suitable method can be used. The LUT 5 is stored in memory 4 of the scanner 1. In embodiments, the LUT 5 stores 256 points of the TRC. However, more or fewer points can be stored.

Once the scanner 1 is deployed for use, such as in a customer environment, the output of the scanner 1 will deviate from the correct, ideal output due to the effects of time, changing of the intensity and frequency distribution of the luminous output of the scanner's lamp, and changing of the sensing characteristics of the scanner's sensor.

Figure 3B:
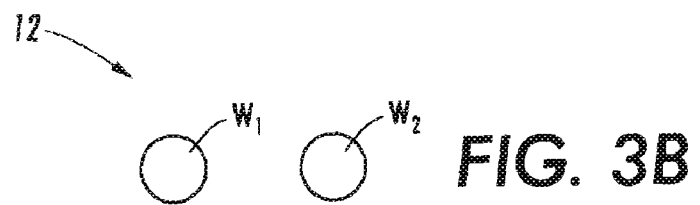
Figure 3C:
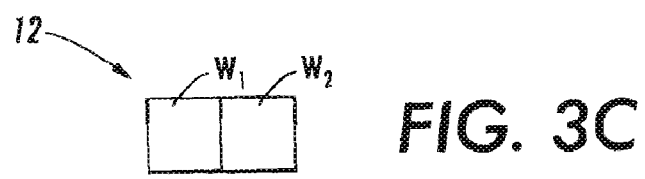

In order to recalibrate the image acquisition device sensor 2, a second set of calibration tone patches 12 having known densities $w_i$, i=1 to m, is used, as shown in FIG. 3B. The second set of tone patches 12 can be fixed to the scanner 1 at manufacture, such as, for example, as a calibration strip 13 as shown in FIG. 3C. However, because tone patches, including calibration strips, are subject to yellowing or other discoloration with time, it is preferred that the second set of tone patches 12 can be provided at the time of recalibration. In preferred embodiments, the second set of tone patches 12 includes two tone patches having known densities $w_i$, i=1 to 2. Further to these embodiments, $w_1$ and $w_2$ are chosen close to the extremes of the density range such as, for example, $w_1$=0.1 and $w_2$=1.5. The sensor 2 senses the tone patches of the second set of tone patches 12 and outputs second sensed density values $z_i$, i=1 to m.

The processor 3 calculates output values for sensed density values sensed by the sensor 2 based on the stored TRC, the known densities $w_i$, i=1 to m, and the sensed density values $z_i$, i=1 to m. More specifically, the processor 3 utilizes the stored TRC, the known densities $w_i$, i=1 to m, and the sensed density values $z_i$, i=1 to m to determine a shift correction to compensate for the drift in accuracy of the stored TRC over time. In preferred embodiments, m=2.

To determine the shift correction for the stored tone reproduction curve, the processor 3 determines difference values $\Delta w_i = w_i - f(z_i)$, i=1 to m, where $w_i$ is the known density of the ith tone patch of the tone patches 12 and $f(z_i)$ is the ith density value of the TRC corresponding to the ith second sensed density value $z_i$.

From the difference values $w_i$, the processor 3 generates a corrected output $t_j = f(v_j) + ((\Delta w_1 - \Delta w_2)/(z_1 - z_2)) * (v_j - z_2) + \Delta w_2$, wherein $t_j$ is a jth second TRC value, and $f(v_j)$ is the density value output by the TRC corresponding to an input jth sensed density value $v_j$ Output from the sensor 2, and $v_j$ is the jth sensed density value.

The output $t_j$ can be limited, such as by a function such as $t_{out}$=min (max ($t_j$, 0), 255).

An image acquisition device can include a recalibration initiation unit that determines when recalibration should be performed. The recalibration initiation unit can include a timing unit configured to periodically determine when calibration by the second set of tone patches is necessary or recommended. In embodiments, the timing unit can determine recalibration should be performed when a predetermined time, set either by the manufacturer or, alternatively, by the customer, has transpired since the last time recalibration occurred. Additionally or alternatively, the timing unit can determine that recalibration is needed after a predetermined number, set either by the manufacturer or, alternatively, by the customer, of image scans is performed by the sensor 2.

The recalibration unit also can have a deviation sensing unit that periodically compares sensed density values output by the sensor 2 after sensing tone patches, such as a recalibration strip, accessible to the sensor 2. If the sensed density values deviate from the known densities of the tone patches or recalibration strip (even though with aging it is likely that the recalibration strip or tone patches deviate from the known densities), the deviation sensing unit can indicate that recalibration should be performed. The recalibration initiation unit can determine when it is necessary to determine whether recalibration should be performed, at which point the deviation sensing unit carries out the actual determination whether recalibration should be performed.

In the event that a recalibration initiation unit and/or deviation sensing unit determines that recalibration should be performed, the scanner 1 can indicate this to the customer. Thereafter, the customer can initiate the recalibration process, such as by determining if a new set of tone patches 12 is required, and, if so, requesting a tone patch set 12 from the supplier.

What is claimed is:

1. A method of calibrating an image sensing system, the method comprising the steps of:
   sensing, by a photoelectric sensor, a first set of tone patches having first known densities and outputting first sensed density values;
   generating a first tone reproduction curve based on the first sensed density values and the first known densities, the first tone reproduction curve providing corrected density values for corresponding sensed density values output by the photoelectric sensor;
   storing the first tone reproduction curve in a storage device;
   sensing, by the photoelectric sensor, a second set of tone patches having second known densities and outputting second sensed density values, the second set of tone patches being sensed at a time subsequent to a time when the first set of tone patches was sensed; and
   calibrating the first tone reproduction curve to generate a second tone reproduction curve that is a calibrated tone reproduction curve based on the first tone reproduction curve, the second sensed density values, and the second known densities.

2. The method according to claim 1, wherein the first set of tone patches comprises more than two tone patches and the second set of tone patches consists of only two tone patches.

3. The method according to claim 1, wherein the step of generating a second tone reproduction curve includes shifting the first tone reproduction curve to correct for differences between the values output by the first tone reproduction curve for the second sensed density values and the corresponding second known density values.

4. The method according to claim 1, wherein:
   the first set of tone patches includes three or more (n) tone patches having known densities $x_i$, i=1 to n, to produce the first sensed density values $y_i$,
   the first tone reproduction curve is generated based on the first sensed density values $y_i$ and the known densities $x_i$,
   the second set of tone patches includes two or more (m) tone patches having known densities $w_i$, i=1 to m, to produce second sensed density values $z_i$; wherein m<n, and
   the second tone reproduction curve is generated based on the first tone reproduction curve, the second sensed density values $z_i$ and the known densities $w_i$.

5. The method according to claim 4, wherein the first set of (n) tone patches each have different known densities $x_i$, i=1 to n, and the second set of (m) tone patches each have different known densities $w_i$.

6. The method according to claim 5, wherein the lowest density of known densities $x_i$ and the lowest density of known densities $w_i$ are equal, and the highest density of known densities $x_i$ and the highest density of known densities $w_i$ are equal.

7. The method according to claim 4, wherein m=2 and the step of generating the second tone reproduction curve comprises the steps of:
  determining difference values $\Delta w_i = w_i - f(z_i)$, i=1 to 2, where $w_i$ is the known density of the ith tone patch of the two tone patches and $f(z_i)$ is the ith corrected density value of the tone reproduction curve corresponding to the ith second sensed density value $z_i$;
  generating the second tone reproduction curve to be $t_j = f(v_j) + ((\Delta w_1 - \Delta w_2)/(z_1 - z_2))*(v_j - z_2) + \Delta w_2$, wherein $t_j$ is a jth second tone reproduction curve value, and $f(v_j)$ is the first tone reproduction curve value corresponding to an input jth sensed density value $v_j$ from an image, and $v_j$ is the jth sensed density value.

8. The method according to claim 4, wherein the step of sensing three or more tone patches comprises sensing five tone patches, each of the five tone patches having different known densities $x_x$, i=1 to 5.

9. The method according to claim 8, wherein $x_1=0.1$, $x_2=0.3$, $x_3=0.6$, $x_4=1.2$, and $x_5=1.5$.

10. The method according to claim 4, wherein the tone reproduction curve is stored in the storage device as a look-up table.

11. An image acquisition device comprising:
  a photoelectric sensor configured to sense a density of a portion of an image and to output sensed density values;
  a storage unit storing a tone reproduction curve that provides a corrected density output corresponding to an input sensed density value; and
  a processor configured to produce a calibration correction for the tone reproduction curve from sensed density values $z_i$, i=1 to 2, of two tone patches having known densities, the processor configured to:
    determine difference values $\Delta y_i = y_i - f(z_i)$, i=1 to 2, where $y_i$ is the known density of the ith tone patch of the two tone patches and $f(z_i)$ is the corrected density value output by the tone reproduction curve corresponding to the ith sensed density value $z_i$, and
    generate the calibration correction for the tone reproduction curve to be $v_j = f(v_j) + ((\Delta y_1 - \Delta y_2)/(z_1 - z_2))*(v_j - z_2) + \Delta y_2$ where $y_j$ is the jth corrected density, $f(v_j)$ is the tone reproduction curve value corresponding to a jth input sensed density from an image, and $v_j$ is the jth sensed density value.

12. The image acquisition device according to claim 11, wherein the tone reproduction curve is stored in the storage device as a look-up table.

13. An image acquisition device calibration system comprising:
  a photoelectric sensor configured to sense a density of a portion of an image and to output sensed density values;
  a storage unit storing a first tone reproduction curve that provides a corrected density output corresponding to a sensed density value sensed by the photoelectric sensor; and
  a processor configured to:
    sense, using the photoelectric sensor, sensed density values $z_i$, i=1 to m, of a set of (m) calibration tone patches having known densities $w_i$, i=1 to m, and
    calibrate the first tone reproduction curve to generate a second tone reproduction curve that is a calibrated tone reproduction curve based on the first tone reproduction curve, the second sensed density values $z_i$, i=1 to m, and the second known densities $w_i$, i=1 to m.

14. The system according to claim 13, wherein the first tone reproduction curve is stored in the storage unit as a look-up table.

15. The system according to claim 13, wherein the image acquisition device is a scanner.

16. The system according to claim 13, wherein the image acquisition device further comprises:
  a timing unit configured to periodically determine when calibration by the second set of tone patches is necessary.

17. The system according to claim 13, wherein m=2.

18. The system according to claim 17, wherein $w_1=0.1$ and $w_2=1.5$.

19. The system according to claim 17, wherein the processor is further configured to:
  determine difference values $\Delta w_i = w_i - f(z_i)$, i=1 to m, where $w_i$ is the known density of the ith tone patch of the calibration tone patches and $f(z_i)$ is the corrected density value output by the first tone reproduction curve corresponding to the ith sensed density value $z_i$, and
  generate the second tone reproduction curve to include $t_j = f(v_j) + ((\Delta w_1 - \Delta w_2)/(z_i - z_2))*(v_j - z_2) + \Delta w_2$ where $t_j$ is the jth value of the second tone reproduction curve, $f(v_j)$ is the tone reproduction curve value corresponding to a jth input sensed density from an image, and $v_j$ is the jth sensed density value.

* * * * *